March 2, 1954

G. L. BURKETT 2,670,675

MACHINE AND METHOD FOR BALING LOOSE MATERIAL

Filed March 10, 1950

INVENTOR.
GRIFFITH L. BURKETT,
BY:
Harold B. Hood.
ATTORNEY.

March 2, 1954  G. L. BURKETT  2,670,675
MACHINE AND METHOD FOR BALING LOOSE MATERIAL
Filed March 10, 1950  4 Sheets-Sheet 2
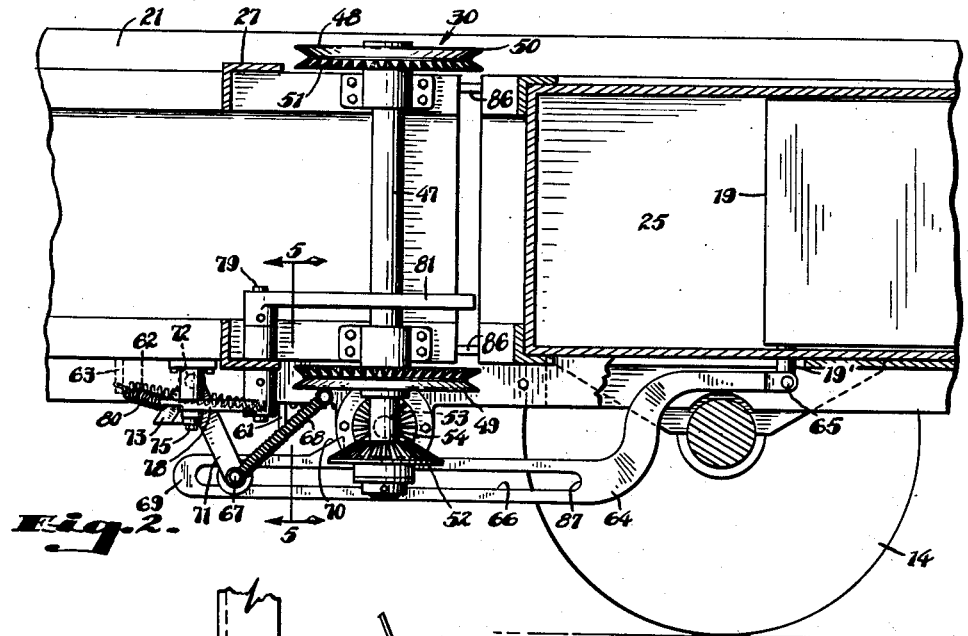
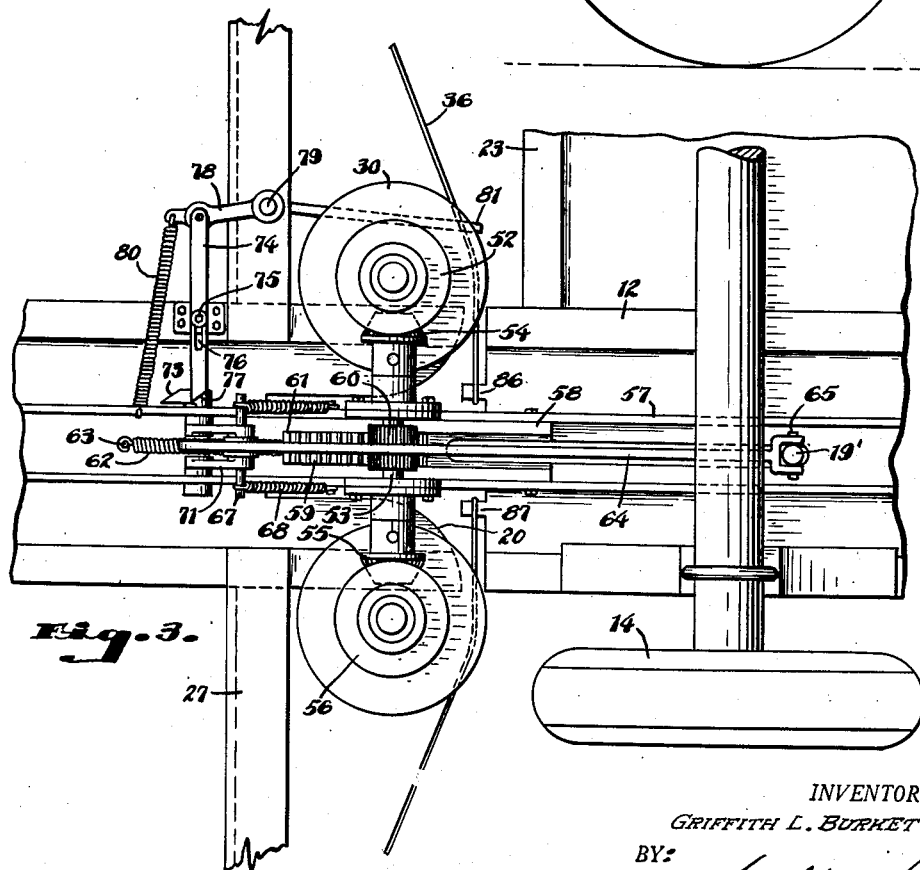
INVENTOR.
GRIFFITH L. BURKETT,
BY: Harold B. Hood.
ATTORNEY.

March 2, 1954   G. L. BURKETT   2,670,675
MACHINE AND METHOD FOR BALING LOOSE MATERIAL
Filed March 10, 1950   4 Sheets-Sheet 3

INVENTOR.
GRIFFITH L. BURKETT,
BY:
Harold B. Hood.
ATTORNEY.

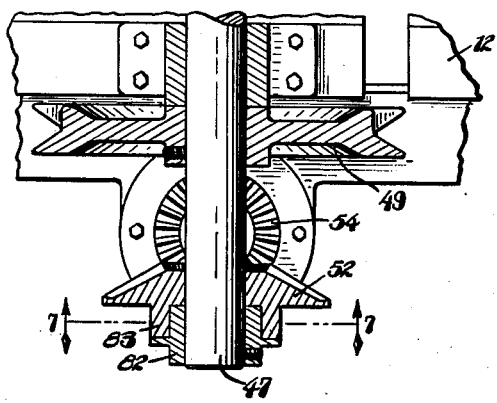
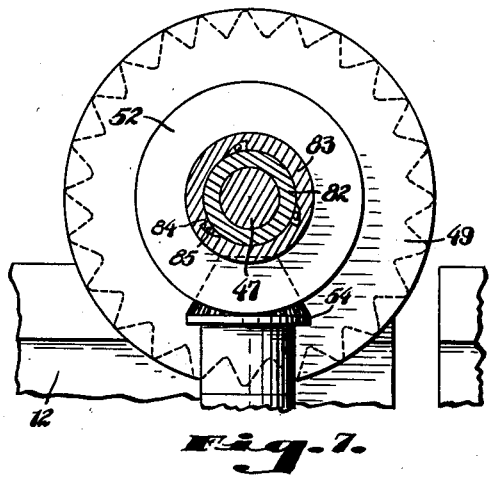
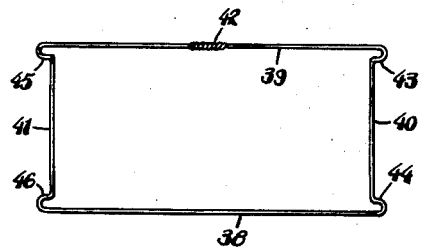
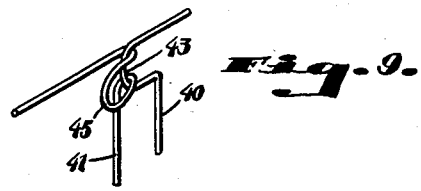
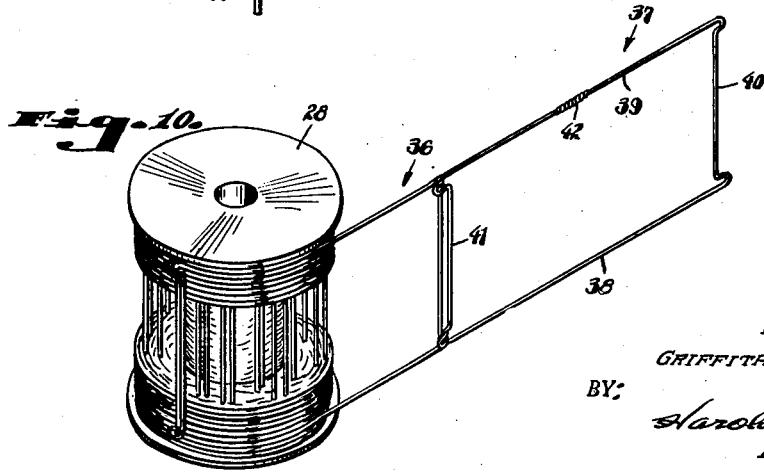

Patented Mar. 2, 1954

2,670,675

UNITED STATES PATENT OFFICE 2,670,675

MACHINE AND METHOD FOR BALING LOOSE MATERIAL

Griffith L. Burkett, Martinsville, Ind.

Application March 10, 1950, Serial No. 149,001

13 Claims. (Cl. 100—4)

The present invention relates to a machine and method for baling loose material, such as hay, straw, alfalfa, other vegetable substances, or any balable material. The invention deals primarily with the problem of securing bales of such material against disintegration; and to that end, I have devised a novel method of applying securing bands to the bales as they progress through a baler of otherwise conventional structure; and novel means for carrying out that method.

Since the birth of the art of baling loose material, a major and troublesome problem has been faced by the industry in the provision of means for securing the bales against disintegration. It was discovered very early that the bales could be so secured by passing suitable strands about the lengthwise perimeter of the bale, before compacting pressure is released therefrom. In the early days of the baling art, it was customary for an attendant periodically to drop a divider board into the mouth of the baling chamber, when the attendant thought that a bale of sufficient length had been compacted in the baling chamber. Such divider boards were provided with grooves extending transversely of the baling chamber; and as a bale, defined at its ends by two divider boards progressed through the baling chamber, the attendant would manually thread a length of wire or twine through such grooves in the divider boards and so across the opposite ends of the bale, then bring the strand about the upper and lower lengths of the bale, and secure the ends of the strand together. Either wire or twine was customarily used in this operation. When twine was used, the ends were knotted; when wire was used, the ends were twisted together.

Subsequently, means was devised for mechanically passing a bight of strand material across the mouth of the baling chamber, holding the free end of such a strand while the progressing material, being introduced into and compacted in the baling chamber, carried the strand length along with it through the baling chamber, and periodically securing the held end of the strand to a trailing end thereof to complete a loop surrounding and retaining the baled material. Devices for knotting twine in such a procedure are rather common; devices for twisting together the ends of wire have heretofore been produced; and I have rather recently perfected a device for knotting together the ends of wire in such a procedure.

Twine binding of bales has been found, in recent years, to be entirely unsatisfactory, primarily because of heavy baling pressures now being used and because of the fact that baled material is often stored in huge quantities, requiring the stacking of bales with a resultant pressure upon the bottom layers which will too frequently rupture twine binding thereof. Wire binding, according to the above procedure, is not entirely satisfactory. It has been found that when the ends of binding wires are merely twisted together, the juncture is insufficiently secure, the twisted ends frequently pulling apart; and, while my wire tying mechanism operates with high efficiency and produces a thoroughly secure juncture, the mechanism is relatively expensive and somewhat complicated, difficult, and sometimes impossible, to repair in the field.

According to the present invention, then, I propose to bind bales with preformed loops of wire, supplied to the baler in reels of mechanically connected preformed wire loops arranged in a chain. Thereby, I completely obviate the necessity for forming any kind of juncture between the ends of binding loops at the machine; and, since the loops are preformed, and can be made and closed by machinery in a suitable factory, all possibility of separation of the joined ends is eliminated.

My invention, thus, comprises the provision of a novel method which involves the step of forming a bale within a preformed loop of strand material; and the provision of means for properly feeding such loops to a baling machine in such a fashion that the loops will be carried, with the material being baled, through the baling chamber of a conventional baling machine, and will be automatically introduced, serially, into proper relationship with the material being processed.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 2 is a side elevation, taken upon an enlarged scale, of a feed roll and certain of the operative parts of my novel mechanism, parts of the conventional baling machine being broken away for clarity of illustration;

Fig. 3 is a bottom plan view of the mechanism illustrated in Fig. 2;

Fig. 6 is an enlarged section through the actuating means for one of the feed rolls;

Fig. 7 is a section taken substantially on the line 7, 7 of Fig. 6;

Fig. 8 is an elevation of a preformed loop used in the practice of my invention;

Fig. 9 is an enlarged perspective view of one form of mechanical connection between adjacent loops in a chain constructed in accordance with my invention; and Fig. 10 is a perspective view of a storage reel and a chain constructed in accordance with my invention, carried by such reel.

Figure 1:
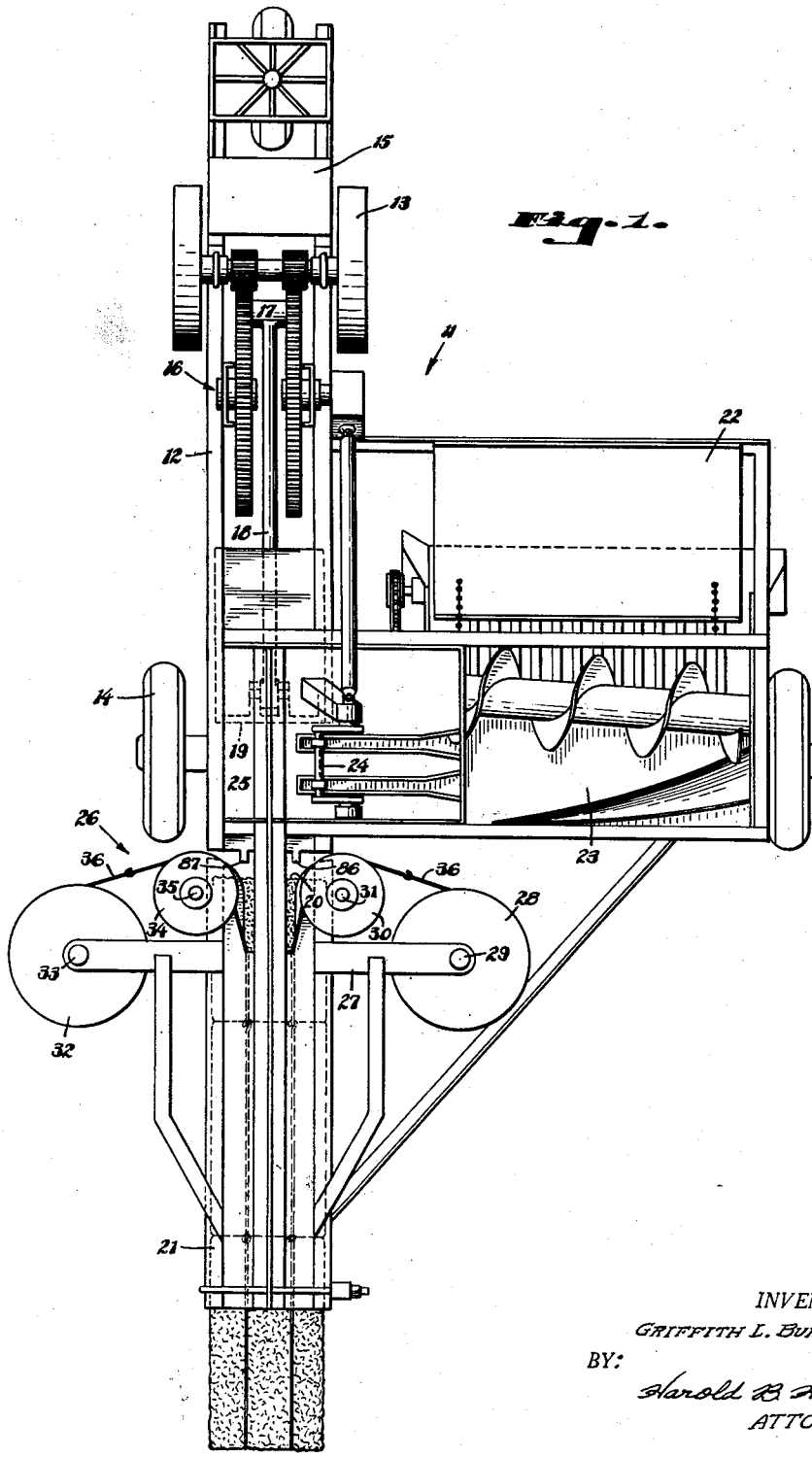
Fig. 1 is a plan view of an otherwise conventional automotive hay baler embodying my invention.
Figure 4:
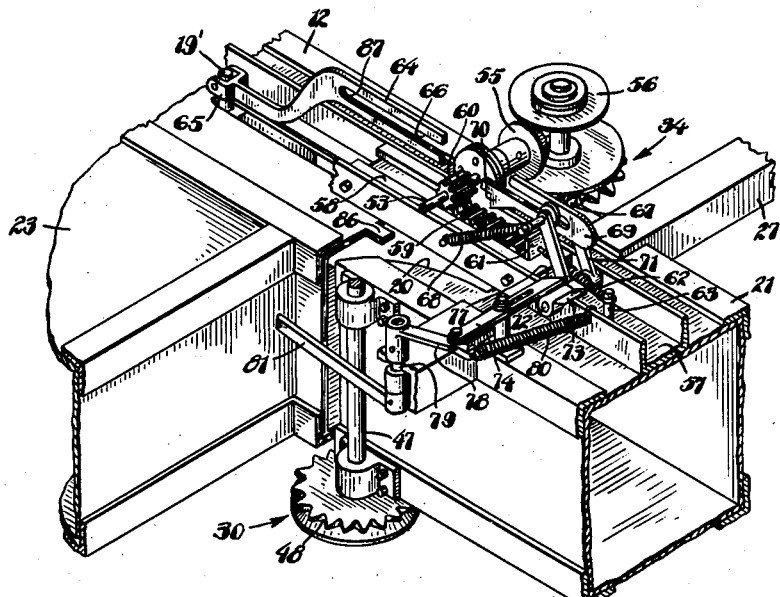
Fig. 4 is an inverted perspective view of the mechanism illustrated in Figs. 2 and 3.
Figure 5:
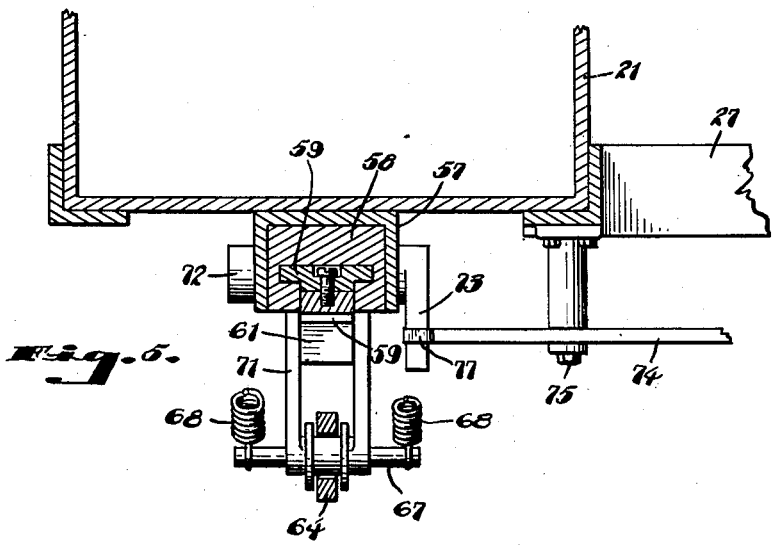
Fig. 5 is a section taken substantially on the line 5, 5 of Fig. 2.

Referring more particularly to Fig. 1, it will be seen that I have illustrated a conventional automotive baling machine, indicated generally by the reference numeral 11, and comprising a frame 12 mounted upon ground wheels 13 and 14 and carrying a prime mover 15, which may be a gasoline engine, connected to drive a fly wheel assembly 16 including an eccentric 17 which, by a pitman 18, is connected to reciprocate a baling plunger 19. The plunger 19, according to conventional practice, is guided to reciprocate rectilinearly toward and away from the mouth 20 of a baling chamber 21 of conventional construction. Gathering means 22 is designed to pick up material lying in windrows in a field, and to deliver the same to gathering and forwarding mechanism indicated at 23, whence the material is transported, by suitable transfer mechanism 24, to a region 25 immediately ahead of the baling chamber mouth 20, and through which the plunger 19 travels. As the plunger 19 reciprocates, it will force successive wads of material into and through the baling chamber mouth 20, whereby material is caused to progress through said chamber and out the delivery end thereof, meantime being compacted, all in accordance with standard practice.

Adjacent the baling chamber mouth 20, I have shown my novel means 26 for delivering preformed loops of strand material to the baling chamber, whereby, as the plunger forces the material to move through the chamber, the material will carry with it such preformed loops to encircle and retain each bale as it is formed.

A suitable framework 27 supports a storage reel 28, mounted to rotate upon its axis 29, and a storage reel 32 mounted to rotate upon its axis 33. I prefer to provide two such storage reels located, respectively, on opposite sides of the median plane of the baling chamber, whereby a chain of loops may be fed into the baling chamber from each side thereof. As shown, the reels are mounted at the lateral sides of the baling chamber upon vertical axes; but it will be clear that, if preferred, they might be located above and below the baling chamber on horizontal axes.

Immediately adjacent one side of the baling chamber mouth is a feed device or roll 30, arranged to rotate upon an axis 31 parallel to the axis 29, and to receive and guide a chain 36 supplied from the storage reel 28. A similar feed roll 34 is mounted upon an axis 35 similarly related to the opposite side of the baling chamber mouth and to the storage reel 32.

Each chain 36 is made up of a plurality of serially arranged and mechanically interconnected, preformed wire loops, indicated generally by the reference numeral 37 in Fig. 10. Each loop comprises a lower run 38 and an upper run 39 elongated in the direction of chain length, a leading end 40 and a trailing end 41, elongated in a direction transverse to the direction of chain length, and joining the lower and upper runs, and a juncture 42 closing the loop. I presently believe that the juncture 42 should preferably be formed by welding; but it may be formed in any desired manner so long as the tensile strength of the juncture is substantially equal to the tensile strength of the body of the strand from which the loop is formed. It will further be understood that, while I presently believe steel or iron wire to be the optimum material for use in forming these loops, steel strip or ribbon or any other suitable material of comparable tensile strength and capable of being joined strongly to form endless loops, may be used in place of wire.

The leading ends of the upper and lower runs are rebent as at 43 and 44, while the trailing ends thereof are rebent as at 45 and 46; and the resultant bights are suitably manipulated to provide hooks whereby the leading end of each loop in a given chain, following the front loop, may be mechanically connected to the trailing end of the next preceding loop. Several kinds of such manipulation will immediately occur to one skilled in the art; but I have shown one type in Fig. 9, wherein the rebent portions 45 and 46 are turned forwardly toward the body of the loop and hooked through the rebent portions 43 and 44 of the next following loop. As will appear from the description hereinafter, this arrangement is such that, during transit of the bound bale through the machine, or upon discharge thereof from the baling chamber, expansion of the baled material will straighten out the trailing end 41 of the binding loop to disengage the rebent portions 45 and 46 from the cooperating portions of the following loop.

The rolls 30 and 34 are identical in construction; and therefore only one of them has been shown in detail and will be described herein. The roll 30 comprises the shaft 47 mounted for rotation in suitable bearings supported from the baling chamber or the frame 27. At its upper end, the roll carries a sheave 48 comprising a tapered upper flange 50 and a tapered and serrated lower flange 51. The sheave 48 is located slightly above the top wall of the baling chamber 21; and an identical, but allochirally related, sheave 49 is fixed to the shaft 47 at a level slightly below the bottom wall of the baling chamber. At its bottom end, the shaft 47 carries a beveled gear 52.

Mounted in suitable bearings and extending transversely beneath the bottom wall of the baling chamber is a shaft 53, to one end of which is fixed a beveled pinion 54 meshing with the gear 52, and to the other end of which is fixed a beveled pinion 55 meshing with a corresponding beveled gear 56 constituting a part of the forwarding roll 34.

A downwardly-opening channel 57 is secured to the bottom wall of the baling chamber, extending longitudinally thereof, and a block 58 is fixed in said channel, said block being formed to provide a slideway or track in which is slidably received a rack 59, arranged to move in a line parallel with the line of movement of the baling plunger 19. A pinion 60 fixed to the shaft 53 meshes with the rack 59. At its rear end, the rack is provided with a depending lip 61 for a purpose which will become apparent as the description proceeds. A spring 62 has one end anchored to the rearmost end of the rack 59, its other end being anchored to a pin 63 depending from the channel 57.

A bar 64 has one end pivotally connected, as at 65, with a depending finger 19' fixedly associated with the baling plunger 19. The bar 64 is formed with a longitudinally-extending slot 66 in which rides a pin 67 (preferably carrying a roller within the slot) supported at the free end of a yoke 71 fixed to a rock shaft 72 journalled in suitable bearings carried by the channel 57. A finger 73 is likewise fixed to the rock shaft 72.

A detent 74 is supported upon a post 75 passing through a longitudinally-extending slot 76 in said detent, for reciprocation into and out of blocking relation with the finger 73, said detent being formed with a cammed surface 77 at its end adjacent the finger 73. The opposite end of said detent is pivotally connected to a lever 78 fixed to a rock shaft 79 suitably journalled in the frame 27, and a spring 80, connected to the lever 78, urges the detent into its illustrated position for blocking the finger 73. The rock shaft 79 carries a trip arm 81 which, as is most clearly shown in Figs. 2 and 3, extends into the plane of travel of that chain 36 with which the feed roll 30 cooperates.

Reels 28 and 32, carrying chains 36 of interconnected loops 37, being mounted upon the frame 27, the chain from the reel 28 is threaded partially around the feed roll 30, and its leading end 40 is hooked over two rearwardly-projecting fingers 86, in the manner illustrated in Figs. 2 and 3. Similarly, the chain 36 from the reel 32 is threaded partially around the feed roll 34 and the leading end 40 of its first loop 36 is hooked over two similar fingers 87. Thus, the leading ends 40 of loops from both reels are disposed in traversing relation to the baling chamber mouth 20 in the path of material to be forced by the plunger 19 from the region 25 into the open mouth 20 of the baling chamber. As the plunger moves forward, carrying with it such a wad of material, the wad will engage the leading ends of both loops, and will carry said ends with the wad into the open mouth of the baling chamber. The rolls 30 and 34 and the reels 28 and 32 will move freely to permit the chains 36 to advance as the leading ends of their leading loops are thus forced into the baling chamber, since the reels are free to rotate, and the rolls are connected to their gears 52 and 56 through one-way clutches, as illustrated in Fig. 6. Thus, a collar 82 is fixed to the lower end of the shaft 47, while the gear 52 is formed with a hub 83 sleeved on such collar. Said hub is formed, in accordance with well-known practice, with a plurality of eccentric sockets 84 in each of which is received a ball or roller 85, the arrangement being such that the shaft 47 may rotate freely in a clockwise direction as viewed in Fig. 7, without corresponding movement of the gear 52; whereas clockwise rotation of the gear 52 will drive the shaft 47.

The baling chamber, in accordance with standard practice, will be so constructed as to prevent any substantial retrograde movement of the material received therein as the plunger 19 is retracted. The plunger continues to reciprocate, upon each forward movement driving a further wad of material into the baling chamber, thus causing material previously delivered to the chamber to progress rearwardly through the chamber, and carrying the chains 36 therewith. As the trailing end 41 of each loop enters the grooves of the sheaves 48 and 49, said trailing ends will engage between the teeth 51 of the associated rolls. Upon the next advancing movement of the plunger 19, the trailing end of the loop associated with the roll 30 will engage the trip lever 81 to swing the rock shaft 79 in a clockwise direction as viewed in Fig. 3, thereby retracting the detent 74 to free the finger 73. The springs 68 will thus be permitted to swing the yoke 71 in a counter-clockwise direction as viewed in Fig. 2 to lift the rear end 69 of the bar 64. The length of the trip lever 81 is so related to the peripheral dimension of engagement of the chain with the roll 30 that, no matter at what point in the cycle of the plunger 19 the trailing end of a loop first engages the lever 81, the loop end will not leave that lever during an advancing stroke of the plunger. Thus, as the plunger starts retractile movement, the loop end remains in engagement with the lever 81, holding the detent 74 in retracted position.

Now, as the plunger 19 retreats, the dog 70 will engage the finger 61, to carry the rack 59 toward the right as the plunger completes its retractile movement. Such movement of the rack 59 will rotate the shaft 53 in a clockwise direction as viewed in Fig. 2 to rotate the roll 30 in a counter-clockwise direction, and to rotate the roll 34 in a clockwise direction, as viewed in Fig. 1. Since the teeth of the sheaves 48 and 49 are engaged with the trailing ends 41 of the associated loops, the trailing ends of the loops will thus be advanced, independent of any movement of the material in the baling chamber, thus releasing the trip lever 81 and moving said trailing loop ends to positions traversing the mouth of the baling chamber, and in the path of the next wad of material advanced toward the baling chamber by the plunger from the region 25. Since the leading end 40 of the next succeeding loop in each chain is mechanically connected to such trailing end, the next succeeding loop will thus be moved into position to receive material to be advanced through the baling chamber.

Now, as the plunger begins its next movement toward the chamber mouth, the dog 70 will begin to move toward the left. The spring 62 will correspondingly retract the rack 59; but, since the one-way clutches 82—85 are interposed in the driving trains between the shaft 53 and the rolls 30 and 34, those rolls will not be rotated during such rearward movement of the rack 59. The slot 66 is so designed that, as the plunger 19 approaches the reaward end of its stroke, the end 87 of the slot 66 will engage the pin 67 to swing the yoke 71 in a clockwise direction. As said yoke is so swung, the rock shaft 72 will move the finger 73 in a clockwise direction, and said finger will engage the cammed face 77 of the detent 74 (which has been returned to its illustrated position by the spring 80 immediately upon release of the trip lever 81) to shift said detent upwardly as viewed in Fig. 3, and to pass the detent to attain the position illustrated in Figs. 2 and 3. As the finger 73 passes the detent, the spring 80 will return the detent to its illustrated position, in which it blocks the finger 73 to hold the yoke 71 in its illustrated position, in which the bar 64 is supported with its dog 70 out of cooperative registration with the finger 61 of the rack 59; so that retractile movement of the plunger 19 will not affect the rack 59 until, again, the trip arm 81 is actuated by the trailing end of the next loop in the chain 36.

I claim as my invention:

1. A baling machine including a baling chamber having a mouth, a baling plunger, means for reciprocating said plunger toward and away from said chamber mouth, means for introducing material to be baled into the path of said plunger, whereby successive wads of such material will be forced into said chamber by successive reciprocations of said plunger, a storage reel mounted for rotation adjacent said chamber mouth and constructed and arranged to support a chain of serially-connected, preformed wire loops, and guide means for such a chain acting to support and guide such a chain in a position in which the side of a loop transverse to the direction of travel of said chain is disposed in traversing relation to said baling chamber.

2. The machine of claim 1 including mechanical means, actuated by said plunger, at times, for positively advancing such a chain.

3. The machine of claim 1 including mechanical means, actuated by movement of said plunger away from said baling chamber, for positively advancing such a chain.

4. The machine of claim 3 including retention means normally holding said actuating means inactive, and trip means, actuated by movement of a transverse side of a loop approaching said baling chamber, to withdraw said retention means.

5. A baling machine including a baling chamber having a mouth, means for introducing material to be baled into proximity with said chamber mouth, power means for forcing such material through said chamber mouth into and through said chamber, a storage reel mounted adjacent said chamber mouth and constructed and arranged to support a chain of serially-connected preformed wire loops, and means for supporting a portion of such a chain with the leading end of one loop thereof transverse to the line of movement of such chain, traversing said chamber and in the path of movement of such material therethrough.

6. The machine of claim 5 including mechanical means, actuated periodically after a predetermined degree of travel of such a chain under the influence of material traveling through said baling chamber, to advance such chain positively and independent of movement of such material to bring concurrently into such traversing relation the trailing end of such loop and the leading end of a succeeding loop in such chain.

7. In a baling machine, a baling chamber having a material-receiving mouth, a baling plunger reciprocable toward and away from said chamber mouth, means for reciprocating said plunger, a feed device mounted adjacent said chamber mouth for turning movement about an axis transverse to the line of movement of said plunger, a shaft, a driving train establishing a driving connection between said shaft and said feed device, an element mounted for movement relative to said shaft, a member connected to said plunger for reciprocation therewith, cooperative means on said member and on said element operative, at times, to establish a driving connection between said member and said element, said element being operatively connected to rotate said shaft upon movement thereof relative to said shaft, means resiliently urging said cooperative means into cooperative relation to establish such connection, detent means normally holding said cooperative means out of cooperative relation, and trip means operable to withdraw said detent means.

8. The machine of claim 7 including means operated by said member, at one end of the stroke of said plunger, to shift said cooperative means out of cooperative relation.

9. The machine of claim 7 including a one-way clutch in said driving train between said shaft and said feed device.

10. The machine of claim 7 including a storage reel mounted adjacent said feed device and constructed and arranged to support a chain of serially-connected, preformed wire loops, such chain engaging said feed device, and extending into traversing relation with said chamber mouth, said trip means extending into the path of the end portions of said loops for engagement and actuation thereby as such chain is advanced.

11. The combination with a baling chamber having an inlet mouth, a baling plunger, means for reciprocating said plunger toward and away from said chamber mouth, a feed roll mounted adjacent said chamber mouth but offset from the line of reciprocation of said plunger, a shaft mounted for rotation adjacent said chamber mouth upon an axis transverse with respect to the line of reciprocation of said plunger, means providing a drive train between said shaft and said roll, a pinion drivingly mounted on said shaft, a rack meshing with said pinion and slidably supported for reciprocation in a line parallel with the line of reciprocation of said plunger, a bar having one end operatively connected to move with said plunger, the opposite end of said bar extending into cooperative registry with said rack, means supporting said opposite bar end for movement, transversely of the line of reciprocation of said rack, into and out of active engagement with said rack, means resiliently urging said supporting means to move said bar end into such active engagement, detent means normally holding said supporting means in a position in which said bar end is out of such active engagement, means for withdrawing said detent means, and means resiliently urging said rack toward one end of its stroke, said bar actively cooperating with said supporting means, as said plunger approaches one end of its stroke, to shift said bar out of such active engagement and to engage said supporting means with said detent means.

12. The combination of claim 11 in which said drive train includes a one-way clutch.

13. The combination of claim 11 in which said driving engagement between said bar and said rack is effective only during retractile movement of said plunger away from said chamber mouth, said resilient means coactive with said rack opposes movement of said rack in the direction of such retractile movement of said plunger, and said drive train between said shaft and said feed roll includes a one-way clutch effective to transmit motion to said feed roll only during movement of said rack under the influence of said bar.

GRIFFITH L. BURKETT.

References Cited in the file of this patent

UNITED STATES PATENTS

| Number | Name | Date |
|---|---|---|
| 904,846 | Costello | Nov. 24, 1908 |
| 961,258 | Reither | June 14, 1910 |
| 1,017,202 | Bryan | Feb. 13, 1912 |
| 1,623,172 | Emrick | Apr. 5, 1927 |
| 1,889,372 | Nolan | Nov. 29, 1932 |
| 2,405,688 | Crumb | Aug. 13, 1946 |

FOREIGN PATENTS

| Number | Country | Date |
|---|---|---|
| 341,153 | Italy | June 13, 1936 |